Dec. 24, 1968     J. SCHWEIGER     3,417,892
CONTAINERS WITH SQUEEZED BOTTOM SEAM
Filed May 10, 1965                              2 Sheets-Sheet 1

United States Patent Office 3,417,892
Patented Dec. 24, 1968

3,417,892
CONTAINERS WITH SQUEEZED
BOTTOM SEAM
Josef Schweiger, Kalsdorf, Styria, Austria, assignor to Shell Oil Company, New York, N.Y., a corporation of Delaware
Filed May 10, 1965, Ser. No. 454,361
Claims priority, application Austria, May 11, 1964, A 4,119/64
1 Claim. (Cl. 215—1)

ABSTRACT OF THE DISCLOSURE

A container of plastic material is disclosed. This container includes a bottom portion provided with a sealing seam of which at least the portion nearest the bottom of the container has a thickness greater than the wall thickness of the main body of the container, said seam being positioned in a recessed portion of the container body.

Figure 1:
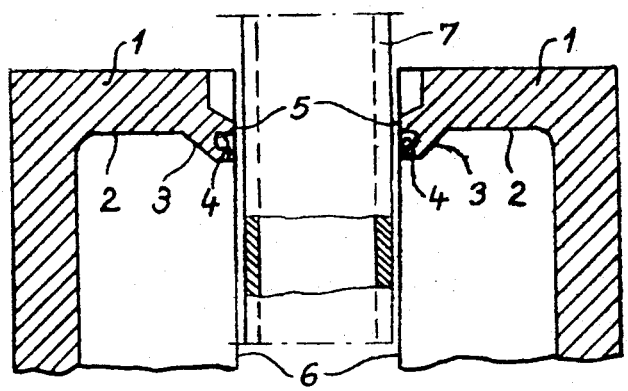

The invention relates to containers of plastic material. More particularly, the invention relates to containers having a bottom portion which is provided with a sealing seam of which at least the portion nearest the bottom of the container has a thickness greater than the wall thickness of the main body of the container.

In the production of containers by the blow-moulding process it is known to introduce a hot thermoplastic tube, which can be received directly from an extruder, into an open blow mould, and to inflate the tube to give it the form of the hollow article it is desired to make after the mould has been closed. When containers are produced in this manner with their opening downwards the tube before inflation is suspended at its upper sealed end between the sealing edges of the mould halves. As a result the upper portion of the plastic and weak tube will be stretched under the own weight of the tube, thus causing a weakening in the upper region of the tube, which is weakened in its upper portion is subsequently formed to a container by the inflation with air, whereby the heat-sealed seam of the container, however, becomes approximately two-thirds weaker than the strongest portion of the bottom of the blown container. As a result of the weakening of the container wall in the region of the seam, the container bottom will already break under a relatively small load. It is therefore the object of the invention to provide blow-molded containers with a strong bottom, which is not weaker than the remaining portion of the container. Such containers may be produced by a blow mold having mold sections which when closed around the tube form a reinforced seam in the sealed upper end of the tube, the thickness of at least the portion of the reinforced seam nearest the bottom of the container being greater than the wall thickness of the tube before inflation.

The invention is particularly of interest for the production of large and heavy containers, wherein each container may have an empty weight of several kilogrammes, since for these containers the conventional blow-moulding process causes a serious weakening of the container bottom for the reason explained before.

The reinforced seam is preferably formed so that the upper end of the tube before its inflation is held in a positive manner by the portions of the mould forming the seam. This means that the tube is not just held by frictional forces between the sealing edges of the mould halves but that by the form of the seam, which for example may have a wider portion at its extremity, the upper end of the tube cannot slip out of the sealing edges. With conventionally produced blow-moulded containers which do not have a flat bottom plane since the seam projects from the bottom, it is difficult to firmly stack one container on top of the other. Therefore, the reinforced seam of the present container is preferably formed in the mould at a level below the upper inner wall of the mould, so that the seam will be positioned in a recess of the bottom of the finished container.

The apparatus for producing containers according to the invention conveniently comprises blow-mould sections for receiving and inflation of the tube, the mould sections being provided with sealing edges for sealing the upper end of the tube in the mould. Adjacent these sealing edges the mold sections are provided with a portion projecting downward, recesses being formed in the sealing edges in the downward projecting portion of the mould for forming the reinforced seam in the tube.

It has been found that the reinforced seam in the container bottom greatly improves the strength of the bottom. The bottom of conventional containers often has a tendency to bulge when the container is filled, and this applies in particular for containers having large and relatively flat bottoms without any reinforcement and also in particular for containers which are filled and maintained under pressure, as for example containers filled with a spraying means to be discharged by gas pressure in the container. The invention has in general been found very useful for containers having a capacity of 100 litres or more.

The reinforced heat-sealed seam is preferably formed as a rib having a thinner, for example stem-like portion, close to the bottom of the container, and a thicker, for example bulge-like portion further away from the bottom. The pinched seam is for example T-shaped in cross-section, or it may be mushroom-shaped, I-shaped, or, as is preferred, be dovetailed.

The tube, which is in a plastic and weak condition, is sealed by the sealing edges of the mould halves when the latter are closed, whereby the upper end of the tube is pinched and held by the T or otherwise shaped recess in the upper portion of the blow mould. The recess forms the seam with a sufficient thickness to allow the sealing edges of the mould to hold the weight of the tube without stretching of the tube.

Figure 2:
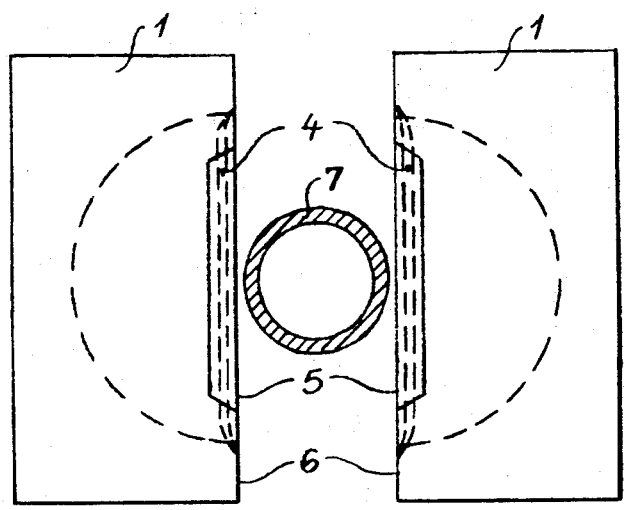
Figure 3:
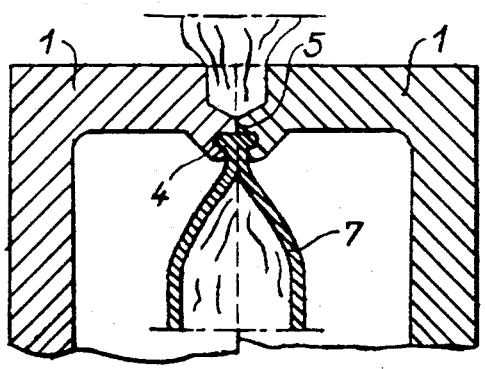
Figure 4:
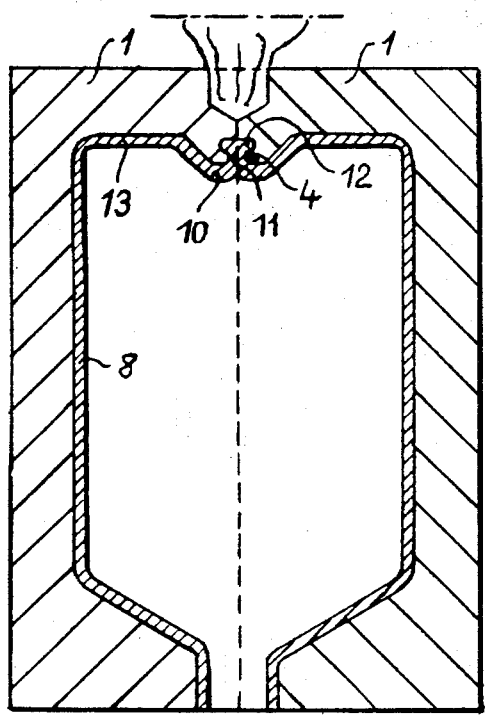
Figure 5:
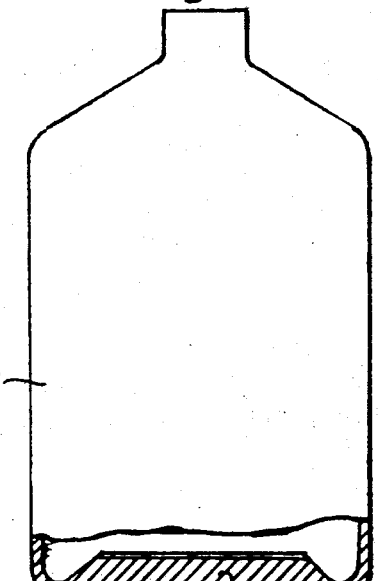
Figure 6:
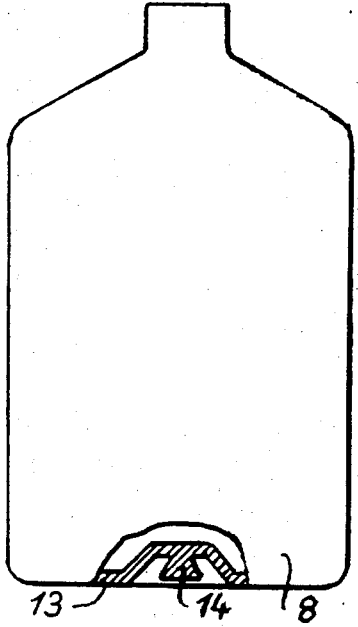

The invention will further be explained with reference to the accompanying schematic drawing in which;

FIG. 1 shows a cross-section of the bottom part of a two-part, opened blow mould for forming hollow articles, FIG. 2 shows a top-plan view of the apparatus according to FIG. 1, FIG. 3 shows the blow mould of FIGS. 1 and 2 in the closed position before inflation of the tube in the mould, FIG. 4 shows a cross-sectional view of the closed blow mould after inflation of the tube, FIG. 5 shows a container according to the invention, FIG. 6 shows another container according to the invention.

In FIGURES 1 and 2 two mould halves 1 are shown in the open position with the bottom 2 turned upwards. In the region of the central axis of the blow mould 1, the bottom 2 has a shoulder 3 projecting obliquely inwards, in which shoulder 3 a T-shaped recess or groove 4 is symmetrically provided on the mould parting line 6. Above the groove 4, along the mould parting line, are sealing and pinching edges 5. The halves 1 of the mould are sufficiently apart to receive a plastic tube 7, for example discharged from an extruder in a hot and plastic state. If the blow mould is now closed, the plastic tube 7 is sealed at its upper end by the sealing and pinching edges 5 and below the edges 5 pressed into the T-shaped recess or groove 4 (FIG. 3). The dimensions of the groove 4 are so chosen that the minimum thickness of the seam is greater than the wall thickness of the tube. The tube inside the mould is thus firmly held in the groove 4 and the thickness of the seam is sufficient to prevent the tube from sagging. By means of air blown into the blow mould through a conventional blowing mandrel (not shown) in the neck portion of the mould the tube is now pressed against the inner surfaces of the mould, whereby a container 8 is formed (FIG. 4). The pressing of the tube into the T-shaped groove 4 in both halves of the mould results in an outwardly directed rib-like reinforcement, which consists of a thinner, stem-like portion 11 close to the bottom of the container, and preferably having a thickness of four-thirds of the wall thickness of the blown container, and of a wider or bulge-like portion 12, situated further away from the bottom of the container. When the mould halves are closed the parts 11 and 12 simultaneously form the reinforced seam and seal the upper end of the tube.

The container of FIGURE 5 shows a longitudinal section of the container bottom 13, through the recessed bottom section 10 and the rib-like reinforcement 11, 12. It is to be noted that the bottom section 10 is recessed sufficiently to allow the rib-like reinforcement 11, 12 to be situated entirely above the plane, which defines the bottom portion of the container. FIGURE 6 shows a somewhat modified embodiment of a container in which the rib-like reinforcement 14 is dovetailed.

I claim:

1. A container of plastic material, including a bottom portion of said container being provided with a sealing seam of a thickness greater than the wall thickness of the main body of the container, said seam being positioned in a recessed portion of the container bottom, and the portion of the seam nearest the bottom of the container being narrower than a lower inward portion of the seam.

References Cited

UNITED STATES PATENTS

| 2,099,055 | 11/1937 | Ferngren | 215—1.5 |
| 2,787,397 | 4/1957 | Radford | 215—1.5 |

FOREIGN PATENTS 1,265,926   5/1961   France.

WILBUR L. McBAY, *Primary Examiner.*

U.S. Cl. X.R.

18—35